(12) United States Patent
Jin et al.

(10) Patent No.: US 9,543,839 B2
(45) Date of Patent: Jan. 10, 2017

(54) VOLTAGE STABILIZING CIRCUIT

(71) Applicants: LITE-ON ELECTRONICS (GUANGZHOU) LIMITED, Guangzhou (CN); LITE-ON TECHNOLOGY CORP., Taipei (TW)

(72) Inventors: Xiaoyi Jin, Nanjing (CN); Zhihong Ye, Nanjing (CN); Dong Xiang, Nanjing (CN)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 0 days.

(21) Appl. No.: 14/853,048

(22) Filed: Sep. 14, 2015

(65) Prior Publication Data
US 2016/0336856 A1 Nov. 17, 2016

(30) Foreign Application Priority Data

May 15, 2015 (CN) ...................... 2015 2 0316012 U

(51) Int. Cl.
*H02M 3/158* (2006.01)
*G05F 1/614* (2006.01)
*H02M 3/156* (2006.01)

(52) U.S. Cl.
CPC .............. *H02M 3/158* (2013.01); *G05F 1/614* (2013.01); *H02M 3/156* (2013.01)

(58) Field of Classification Search
USPC .......................... 323/205, 207, 222, 223, 224
See application file for complete search history.

(56) References Cited

U.S. PATENT DOCUMENTS

| 7,733,678 | B1* | 6/2010 | Notohamiprodjo | H02M 1/4225 |
| | | | | 323/222 |
| 2006/0132105 | A1* | 6/2006 | Prasad | H02M 1/4225 |
| | | | | 323/222 |
| 2012/0274295 | A1* | 11/2012 | Lin | H02M 3/1582 |
| | | | | 323/282 |

* cited by examiner

*Primary Examiner* — Timothy J Dole
*Assistant Examiner* — Bryan R Perez
(74) *Attorney, Agent, or Firm* — Rosenberg, Klein & Lee

(57) ABSTRACT

A voltage stabilizing circuit includes an input capacitor, a booster circuit having an input side coupled across the input capacitor, a first output capacitor coupled to an output side of the booster circuit, and a series connection of a first power switch and a second output capacitor coupled between two terminals of the first output capacitor. The first power switch has a terminal coupled to one terminal of the first output capacitor. The second output capacitor has a first terminal coupled to the other terminal of the first power switch at a common node, and a second terminal coupled to the other terminal of the first output capacitor. A second power switch is coupled between the input capacitor and the common node.

15 Claims, 10 Drawing Sheets

VOLTAGE STABILIZING CIRCUIT

CROSS-REFERENCE TO RELATED APPLICATION

This application claims priority of Chinese Patent Application No. 201520316012.5, filed on May 15, 2015.

FIELD

The disclosure relates to a voltage stabilizing circuit, and more particularly to a voltage stabilizing circuit configured to be applied in a power supplying device.

BACKGROUND

Referring to FIG. 1, a conventional power supplying device 1 is shown to include a rectifying and boosting conversion circuit 11, a series connection of a diode (D1) and an output capacitor (C1), and a DC-to-DC converter 12. The rectifying and boosting conversion circuit 11 receives an alternating current (AC) input voltage (v) from an input power source 10, and rectifies and boosts the AC input voltage (v) so as to output an output voltage (Vr1) at an output side thereof. The series connection of a diode (D1) and an output capacitor (C1) is coupled to the output side of the rectifying and boosting conversion circuit 11 for receiving the output voltage (Vr1) therefrom, and rectifies and filters the output voltage (Vr1). The DC-to-DC converter 12 is coupled in parallel to the output capacitor (C1) for receiving a voltage (Vr2) (C1), and converts the voltage (Vr2) into one or more DC voltages (V11-V1n) which are to be supplied to one or more backend loads (not shown).

In such a configuration, when a brownout condition suddenly or temporarily occurs in the AC input voltage (v) from the input power source 10, typically, by increasing the capacitance of the output capacitor (C1) the working voltage range of the DC-to-DC converter 12, the conventional power supplying device 1 may maintain normal supply of the DC voltages (V11-V1n) within a regulation period, thereby ensuring normal operations of the backend loads, for example, storing information. However, increasing the capacitance of the output capacitor (C1) may increase the volume of the output capacitor (C1) and power consumption of the conventional power supplying device 1. In addition, increasing the working voltage range of the DC-to-DC converter 12 may reduce efficiency of conversion from the voltage (Vr2) to DC voltage(s) (V11-V1n) by the DC-to-DC converter 12 in normal operation thereof.

SUMMARY

Therefore, an object of the disclosure is to provide a voltage stabilizing circuit that can alleviate the drawbacks of the prior art.

According to the disclosure, the voltage stabilizing circuit includes an input capacitor, a booster circuit, a first output capacitor, a series connection of a first power switch and a second output capacitor, and a second power switch.

The input capacitor has a first terminal and a second terminal.

The booster circuit has an input side coupled across the input capacitor, and an output side.

The first output capacitor has a first terminal and a grounded second terminal that are coupled to the output side of the booster circuit.

The series connection of the first power switch and the second output capacitor is coupled between the first and second terminals of the first output capacitor. The first power switch has a first terminal coupled to the first terminal of the first output capacitor, and a second terminal. The second output capacitor has a first terminal coupled to the second terminal of the first power switch at a common node, and a second terminal coupled to the second terminal of the first output capacitor.

The second power switch is coupled between the first terminal of the input capacitor and the common node.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
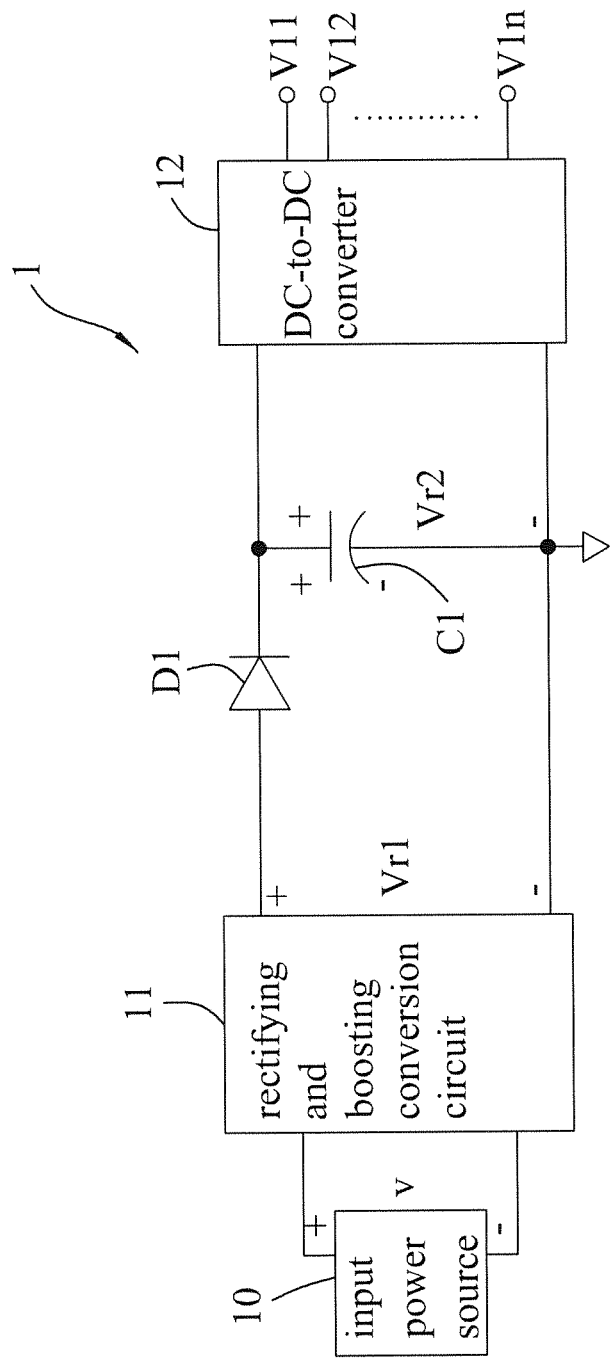
FIG. 1 is a schematic electrical circuit block diagram illustrating a conventional power supplying device.

Before the disclosure is described in greater detail, it should be noted that like elements are denoted by the same reference numerals throughout the disclosure. In addition, when two elements are described as being "coupled in series," "connected in series" or the like, it is merely intended to portray a serial connection between the two elements without necessarily implying that the currents flowing through the two elements are identical to each other and without limiting whether or not an additional element is coupled to a common node between the two elements. Essentially, "a series connection of elements," "a series coupling of elements" or the like as used throughout this disclosure should be interpreted as being such when looking at those elements alone.

Figure 2:
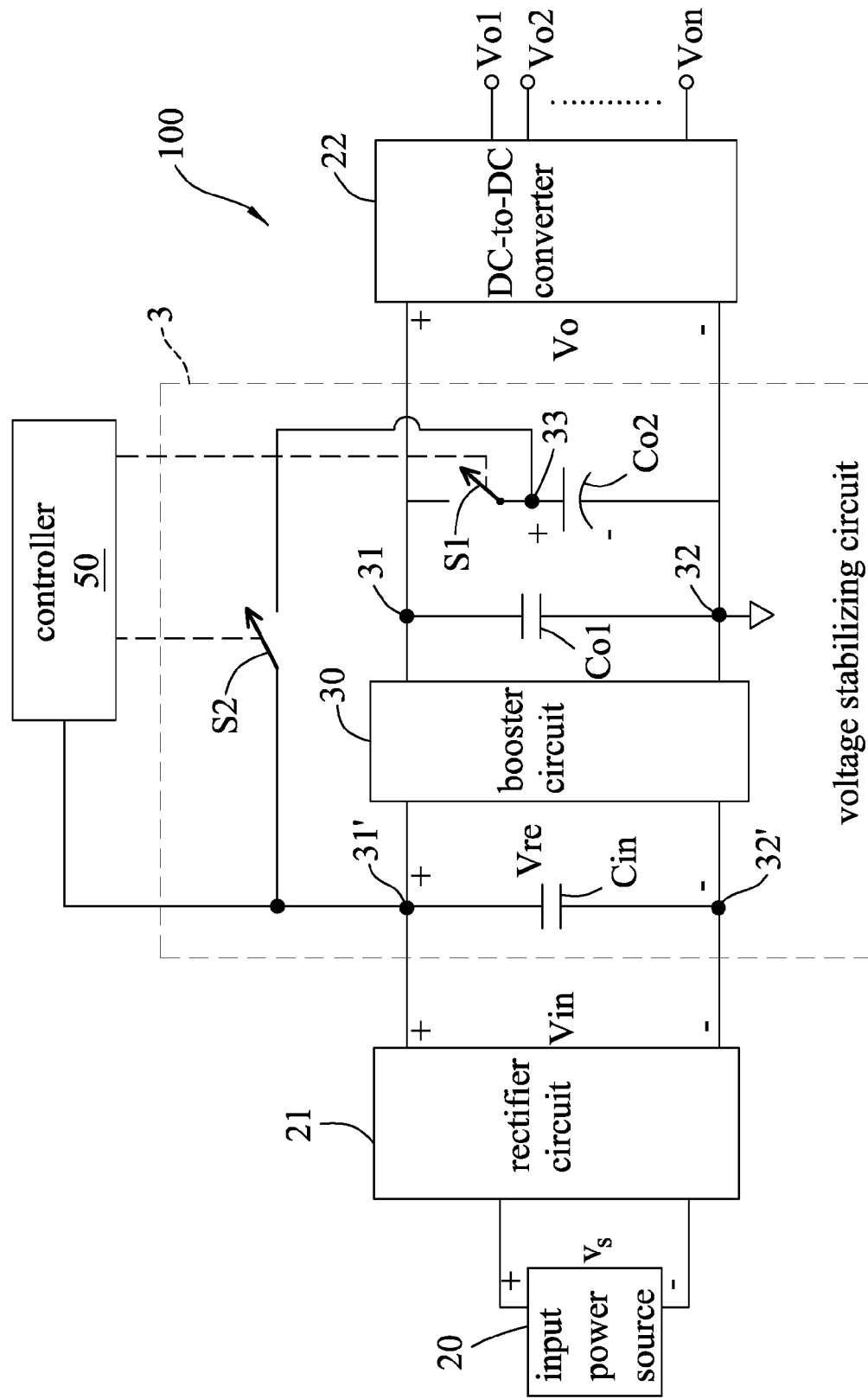
FIG. 2 is a schematic electrical circuit block diagram illustrating the first embodiment of a power supplying device according to the disclosure.

Referring to FIG. 2, the first embodiment of a power supplying device 100 according to the disclosure is shown to include a rectifier circuit 21, a DC-to-DC converter 22 and a voltage stabilizing circuit 3.

The rectifier circuit 21 receives an AC input voltage ($v_s$) from an input power source 20, rectifies the input voltage ($v_s$) so as to generate a direct-current (DC) input voltage (Vin), and outputs the DC input voltage (Vin) at an output side thereof.

The voltage stabilizing circuit 3 is coupled to the output side of the rectifier circuit 21 for receiving the DC input voltage (Vin) therefrom, and is operative to generate an output voltage (Vo) based on the DC input voltage (Vin). In this embodiment, the voltage stabilizing circuit 3 includes an input capacitor (Cin) first and second output capacitors (Co1, Co2), a booster circuit 30, and first and second power switches (S1, S2).

The input capacitor (Cin) has first and second terminals 31', 32' coupled to the output side of the rectifier circuit 21. The input capacitor (Cin) is used to filter and regulate the DC input voltage (Vin) from the rectifier circuit 21 so as to generate a regulated voltage (Vre) thereacross.

The booster circuit 30 has an input side that is coupled across the input capacitor (Cin) for receiving the regulated voltage (Vre) therefrom, and an output side. The booster circuit 30 boosts the regulated voltage (Vre) to a predetermined voltage in a known manner, and outputs the predetermined voltage at the output side.

The first output capacitor (Co1) has a first terminal 31 and a grounded second terminal 32 that are coupled to the output side of the booster circuit 30 for receiving the predetermined voltage therefrom. A voltage across the first output capacitor (Co1), i.e., the predetermined voltage from the booster circuit 30, is outputted to serve as the output voltage (Vo). In this embodiment, for example, the first output capacitor (Co1) may be a non-polar capacitor.

The first power switch (S1) and the second output capacitor (Co2) are coupled in series between the first and second terminals 31, 32 of the first output capacitor (Co1), and are interconnected at a common node 33. It is noted that another terminal of the first power switch (S1) opposite to the common node 33 and another terminal of the second output capacitor (Co2) opposite to the common node 33 are coupled respectively to the first and second terminals 31, 32 of the first output capacitor (Co1). In this embodiment, for example, the second output capacitor (Co2) may be a polar capacitor, and has a positive terminal coupled to the first power switch (S1), and a grounded negative terminal.

The second power switch (S2) is coupled between the first terminal 31' of the input capacitor (Cin) and the common node 33.

In this embodiment, for example, the capacitance of the first output capacitor (Co1) is within a range of about one-fifth to about one-fourth of the capacitance of the second output capacitor (Co2).

The DC-to-DC converter 22 is coupled to the voltage stabilizing circuit 3 for receiving the output voltage (Vo) therefrom, and converts the output voltage (Vo) into one or more DC voltages (Vo1-Von) in a known manner. In this embodiment, the DC-to-DC converter 22 may be regarded as a load having an equivalent impedance ($R_{Ld}$) (see FIG. 3). The DC voltage(s) (Vo1-Von) may be supplied to one or more backend loads (not shown).

Figure 3:
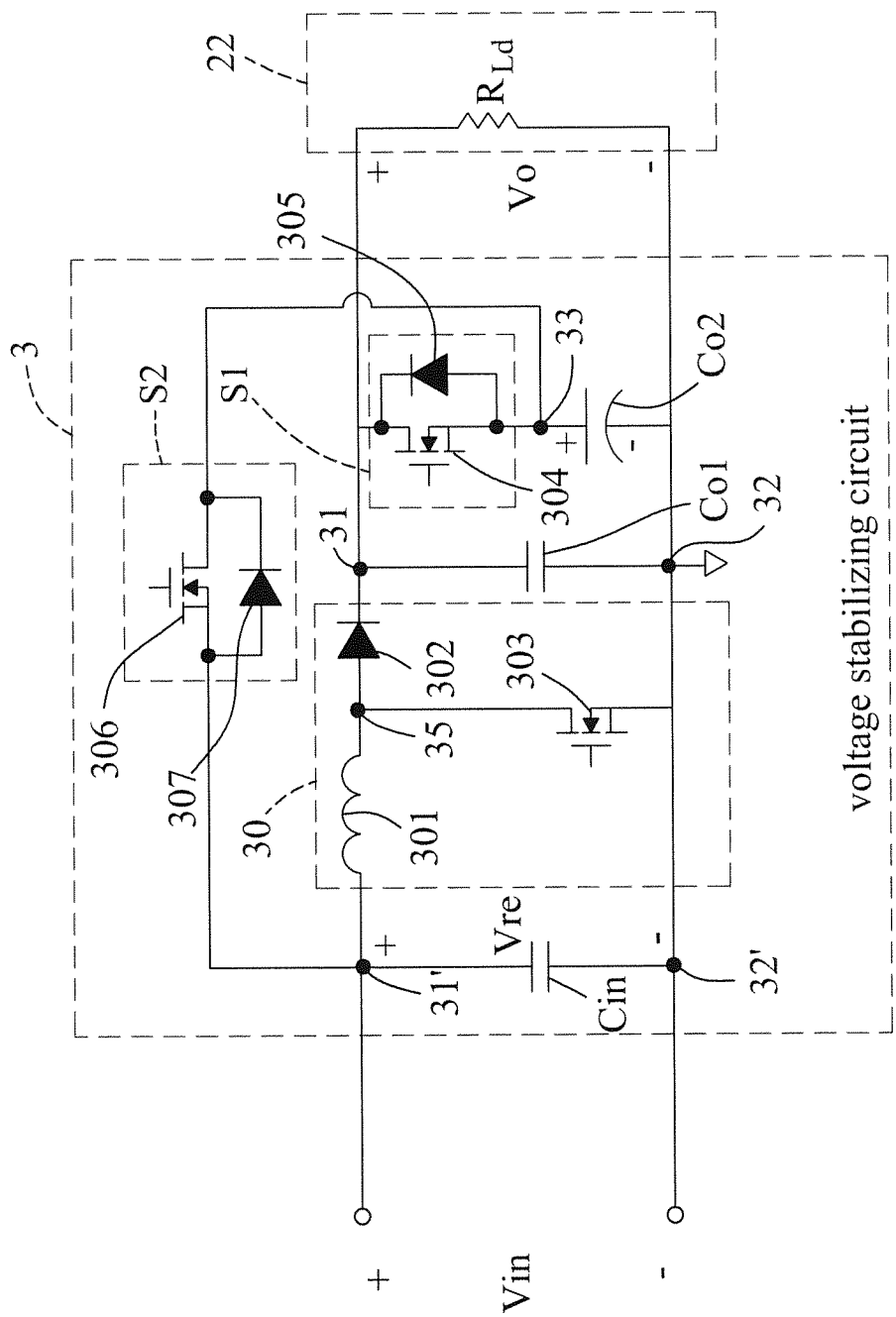
FIG. 3 is a schematic electrical circuit diagram illustrating a voltage stabilizing circuit of the first embodiment.

Referring further to FIG. 3, the following describes the circuit configurations of the booster circuit 30 and the first and second power switches (S1, S2) of this embodiment in detail.

The booster circuit 30 is implemented as, for example, a boost converter, and includes a series connection of an inductor 301 and a transistor 303 coupled in parallel to the input capacitor (Cin), and a diode 302 having an anode that is coupled to a common node 35 of the inductor 301 and the transistor 303, and a cathode that is coupled to the first terminal 31 of the first output capacitor (Co1). It is noted that, in some embodiments, the booster circuit 30 may be implemented as a buck-boost converter or a single-ended primary inductance converter. The first power switch (S1) includes a parallel connection of a transistor 304 and a diode 305 (e.g., a body diode) coupled between the first terminal 31 of the first output capacitor (Co1) and the common node 33. The diode 305 has an anode coupled to the common node 33, and a cathode coupled to the first terminal 31 of the first output capacitor (Co1). The second power switch (S2) includes a parallel connection of a transistor 306 and a diode 307 (e.g., a body diode) coupled between the first terminal 31' of the input capacitor (Cin) and the common node 33. The diode 307 has an anode coupled to the first terminal 31' of the input capacitor (Cin), and a cathode coupled to the common node 33. In this embodiment, each of the transistors 303, 304, 306 is a metal-oxide-semiconductor field effect transistor (MOEFET). However, in some embodiments, the transistors 303, 304, 306 each may be an insulated gate bipolar transistor (IGBT) or a bipolar junction transistor (BJT).

It is noted that the first and second power switches (S1, S2) are controlled, by a controller 50 (shown in FIG. 2 in the drawings but omitted for clarity from FIGS. 3-5) based on the regulated voltage (Vre) across the input capacitor (Cin) and a predetermined reference voltage. More specifically, the controller 50 may receive the regulated voltage (Vre), and determine whether the regulated voltage (Vre) is greater than the predetermined reference voltage. In addition, the predetermined reference voltage may be a voltage sufficient to enable operation of the booster circuit 30.

Figure 4:
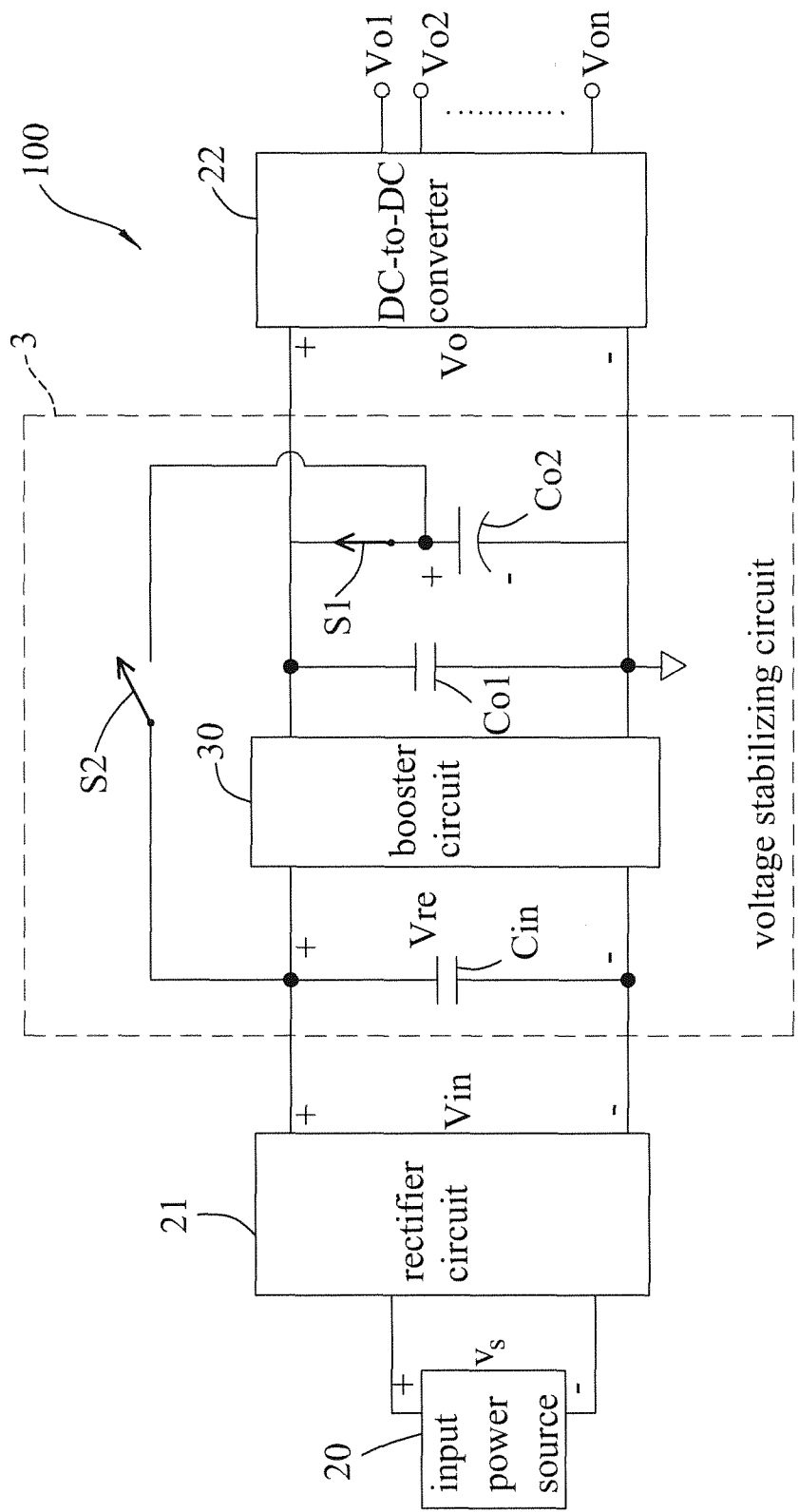
FIG. 4 is a schematic electrical circuit block diagram illustrating the first embodiment when the voltage stabilizing circuit is operated in a normal state.

Referring to FIG. 4, when the input power source 20 normally supplies the AC input voltage ($v_s$), the regulated voltage (Vre) is usually maintained to a voltage not less than the predetermined reference voltage. In other words, the voltage stabilizing circuit 3 is configured to operate in a normal state (see FIG. 4) when it is determined by the controller 50 that the regulated voltage (Vre) is not less than the predetermined reference voltage. In the normal state, the first power switch (S1) is controlled by the controller 50 to be conducting while the second power switch (S2) is controlled by the controller 50 to be non-conducting. Thus, the output voltage (Vo) is normally outputted to the DC-to-DC converter 22 by the voltage stabilizing circuit 3 operating in the normal state. Therefore, the DC voltage(s) (Vo1-Von) may be normally supplied by the DC-to-DC converter 22. In the normal state, since the first and second output capacitors (Co1, Co2) are coupled in parallel to each other, the second output capacitor (Co2) is charged with the output voltage (Vo). In this case, since there is no component coupled between the booster circuit 30 and the DC-to-DC converter 22 except the first and second output capacitors (Co1, Co2), efficiency of voltage conversion from the output voltage (Vo) to the DC voltage(s) (Vo1-Von) by the DC-to-DC converter 22 may be improved.

Figure 5:
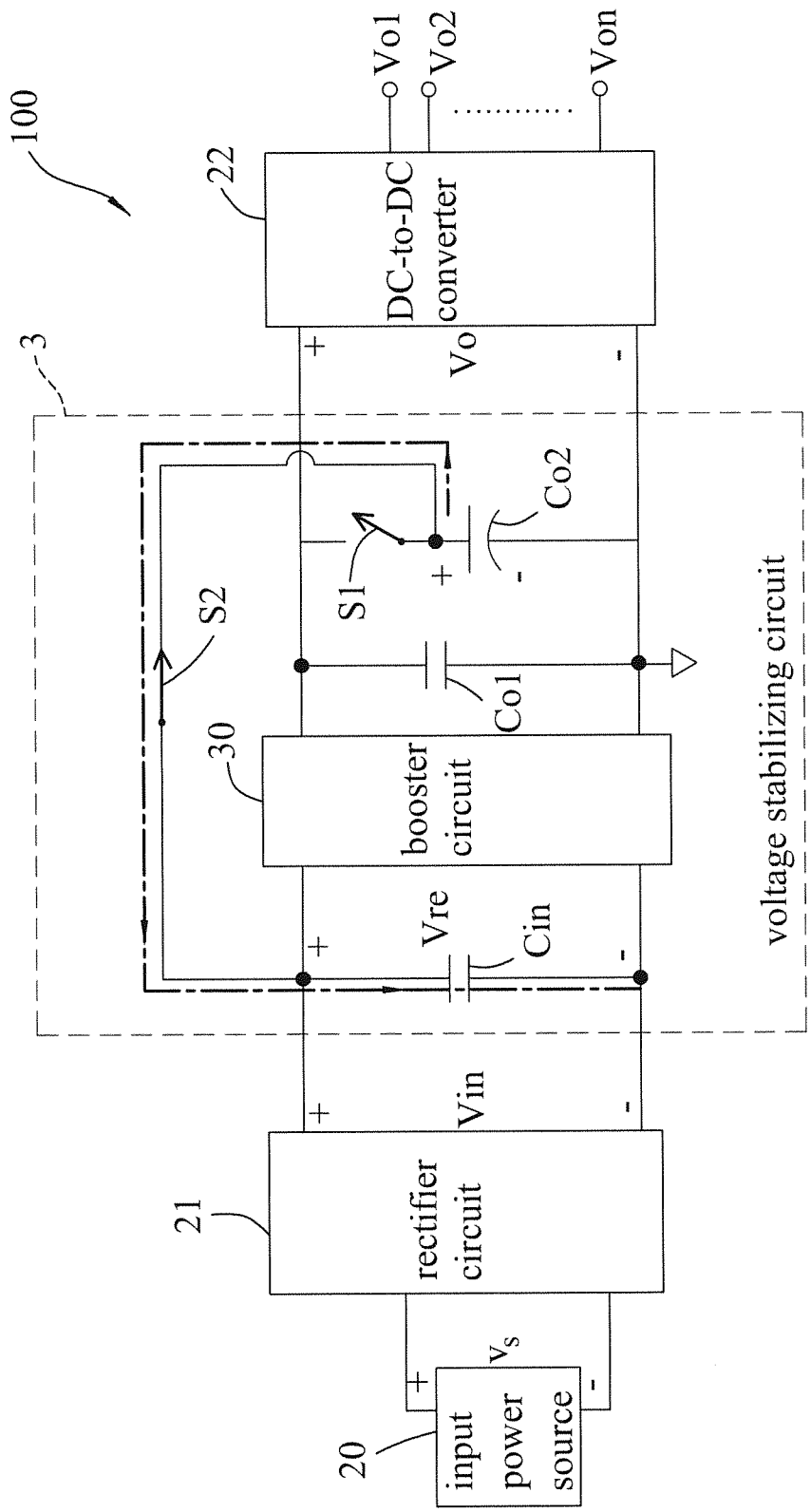
FIG. 5 is a schematic electrical circuit block diagram illustrating the first embodiment when the voltage stabilizing circuit is operated in a power-down state.

Referring to FIG. 5, when a brownout condition suddenly or temporarily occurs in the AC input voltage ($v_s$), for example, the input power source 20 suddenly terminates supply of the AC input voltage ($v_s$), the regulated voltage (Vre) begins to decrease. When it is determined by the controller 50 that the regulated voltage (Vre) is less than the predetermined reference voltage, the voltage stabilizing circuit 3 is configured to operate in a power-down state. In the power-down state, the first power switch (S1) is controlled by the controller 50 to be non-conducting while the second power switch (S2) is controlled by the controller 50 to be conducting. Thus, the input capacitor (Cin) is charged with electric energy previously accumulated on the second output capacitor (Co2) in the normal state through the second power switch (S2), such that the regulated voltage (Vre) is raised up to be not less than the predetermined reference voltage. Therefore, the booster circuit 30 may stably output the predetermined voltage, which is regarded as the output voltage (Vo), within a regulation period after the occurrence of the brownout condition. As a result, the DC voltage(s) (Vo1-Von) may still be normally supplied by the DC-to-DC converter 22 during the regulation period, thereby enabling normal operation(s) of the backend load(s), for example, storing information.

In such a configuration, by virtue of the first and second power switches (S1, S2), the voltage stabilizing circuit 3 is operable between the normal state and the power-down state. The power supplying device 100 of this embodiment has the improved voltage conversion efficiency when the voltage stabilizing circuit 3 operates in the normal state. In addition, upon occurrence of a brownout condition in the AC input voltage ($v_s$), the voltage stabilizing circuit 3 is switched from the normal state to the power-down state such that the power supplying device 100 can still maintain normal supply of the DC voltage(s) (Vo1-Von) during the regulation period with relatively low power consumption compared to the prior art.

Figure 6:
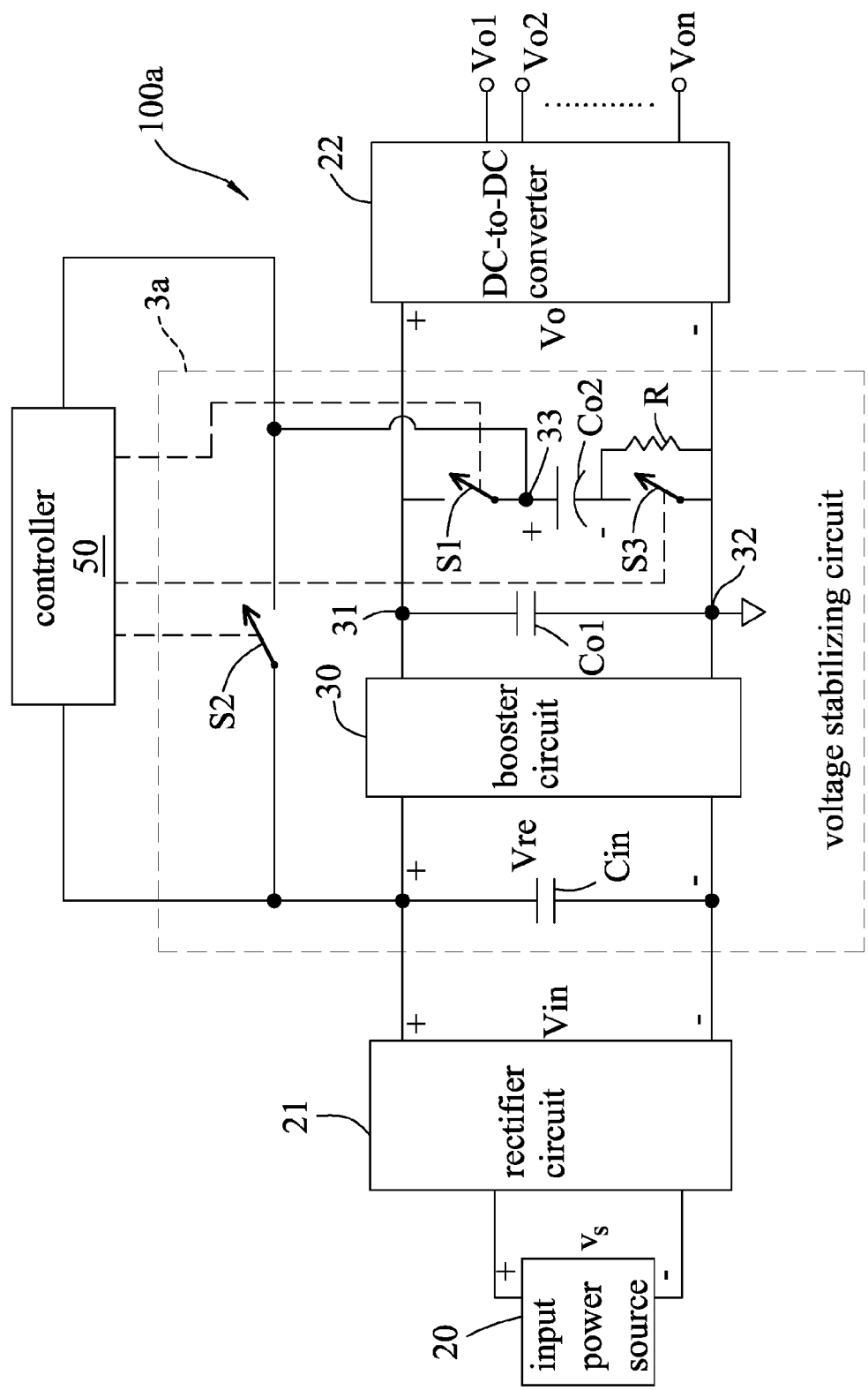
FIG. 6 is a schematic electrical circuit block diagram illustrating the second embodiment of a power supplying device according to the disclosure.

FIG. 6 illustrates the second embodiment of a power supplying device (100a) according to the disclosure. In the second embodiment, the voltage stabilizing circuit (3a) further includes a parallel connection of a third power switch (S3) and a current limiting resistor (R) coupled between the negative terminal of the second output capacitor (Co2) and the second terminal 32 of the first output capacitor (Co1).

It is noted that, in this embodiment, the first, second and third power switches (S1, S2, S3) are controlled, by a controller 50 (shown in FIG. 6 in the drawing but omitted for clarity from FIGS. 7-10) based on the regulated voltage (Vre), a predetermined reference voltage and a voltage across the second output capacitor (Co2). The predetermined reference voltage, similar to the predetermined reference voltage in the first embodiment, may be a voltage sufficient to enable operation of the booster circuit 30. More specifically, the regulated voltage (Vre) and the voltage across the second output capacitor (Co2) are detected by the controller 50. The controller 50 may be incorporated into the power supplying device (100a).

Figure 7:
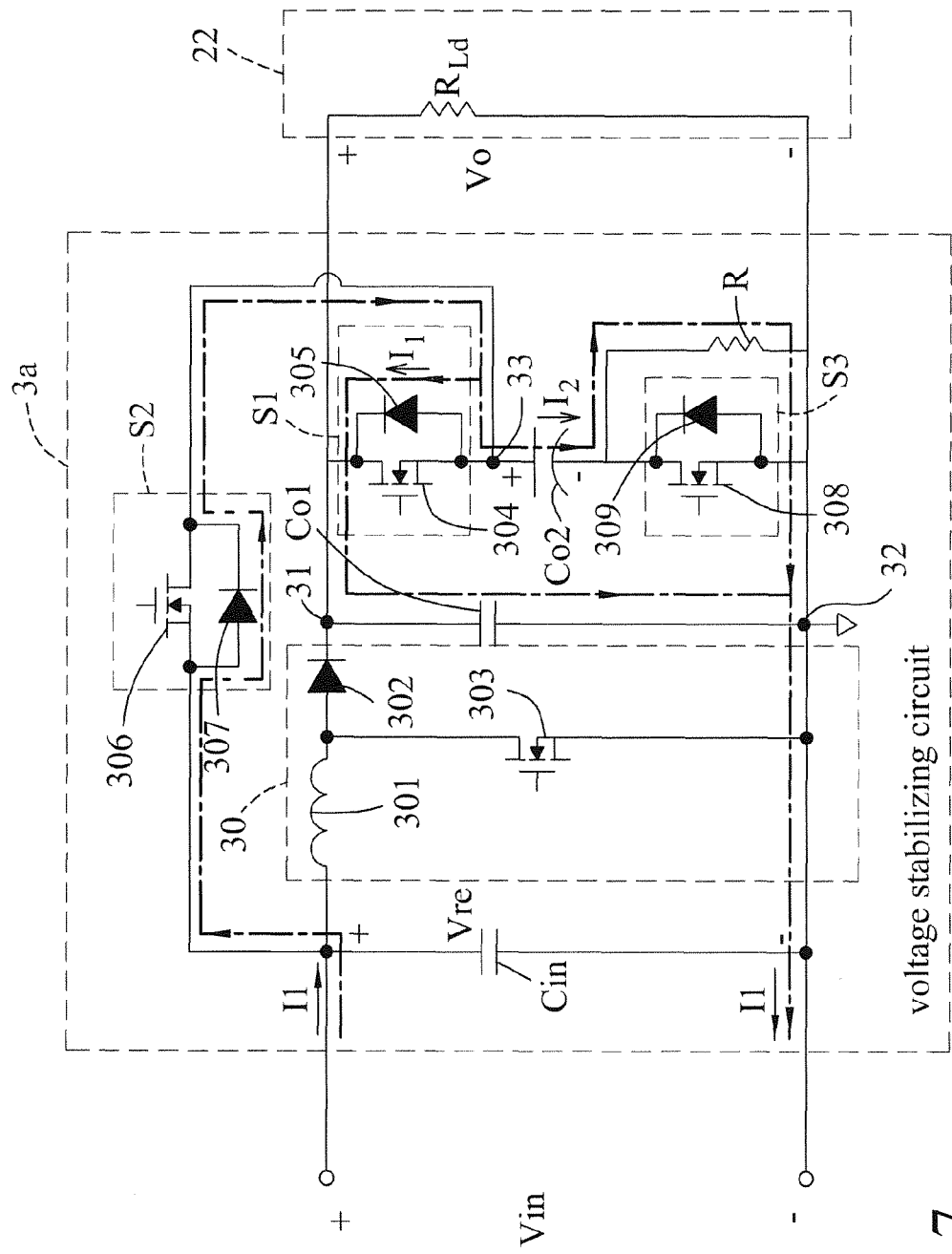
FIG. 7 is a schematic electrical circuit diagram illustrating a voltage stabilizing circuit of the second embodiment.

Referring further to FIG. 7, in this embodiment, the third power switch (S3) includes a parallel connection of a transistor 308 and a diode 309, e.g., a body diode. The diode 309 has an anode coupled to the second terminal 32 of the first output capacitor (Co1), and a cathode coupled to the negative terminal of the second output capacitor (Co2). Similar to the transistors 304, 306, the transistor 308 is an MOSFET. However, in some embodiments, the transistor 308 may be an IGBT or a BJT.

At start of the power supplying device (100a)(see FIG. 6), the first, second and third power switches (S1, S2, S3) may be firstly controlled by the controller 50 to be non-conducting. Thus, an inrush current (I1) generated during startup of the power supplying device (100a) may flows through the diode 307 of the second power switch (S2), and is divided into a first divided current ($I_1$) flowing through the diode 305 of the first power switch (S1) and the first output capacitor (Co1), and a second divided current ($I_2$) flowing through the second output capacitor (Co2) and the current limiting resistor (R). Accordingly, damage to or adverse effect on the first and second output capacitors (Co1, Co2) attributed to the inrush current (I1) can be avoided.

Figure 8:
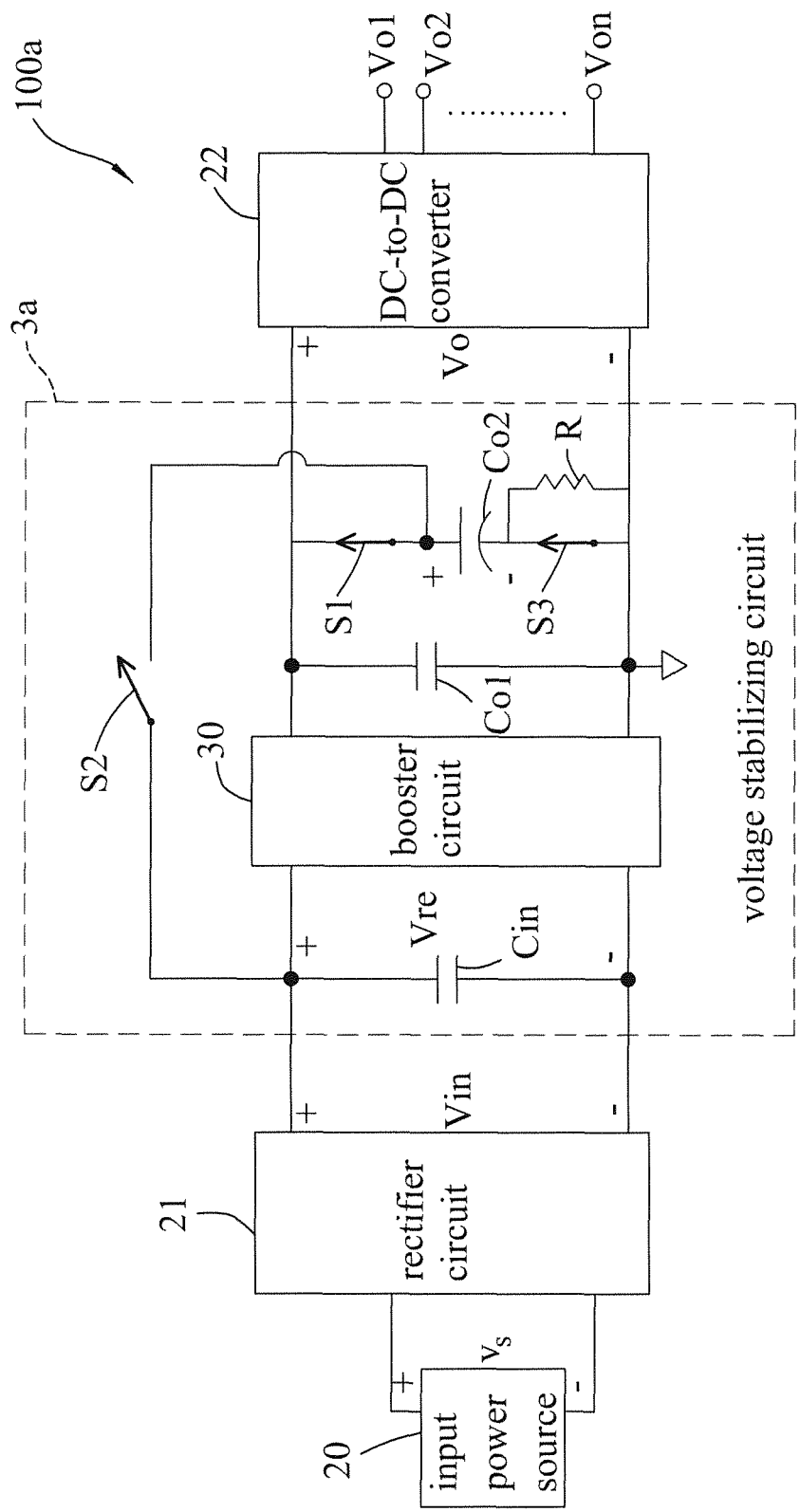
FIG. 8 is a schematic electrical circuit block diagram illustrating the second embodiment when the voltage stabilizing circuit is operated in a normal state.

Referring to FIG. 8, when the input power source 20 normally supplies the AC input voltage ($v_s$), the regulated voltage (Vre) is maintained to a voltage not less than the predetermined reference voltage. In other words, the voltage stabilizing circuit (3a) is configured to operate in a normal state when it is determined by the controller 50 that the regulated voltage (Vre) is not less than the predetermined reference voltage. In the normal state, the first and third power switches (S1, S3) are controlled by the controller 50 to be conducting while the second power switch (S2) is controlled by the controller 50 to be non-conducting. Thus, the output voltage (Vo) is normally outputted to the DC-to-DC converter 22 by the voltage stabilizing circuit (3a) operating in the normal state. Therefore, the DC voltage(s) (Vo1-Von) may be normally supplied by the DC-to-DC converter 22. In the normal state, since the first and second output capacitors (Co1, Co2) are coupled in parallel to each other, the second output capacitor (Co2) is charged with the output voltage (Vo). In this case, since there is no component coupled between the booster circuit (30) and the DC-to-DC converter 22 except the first and second output capacitors (Co1, Co2), efficiency of voltage conversion from the output voltage (Vo) to the DC voltage(s) (Vo1-Von) by the DC-to-DC converter 22 may be improved.

Figure 9:
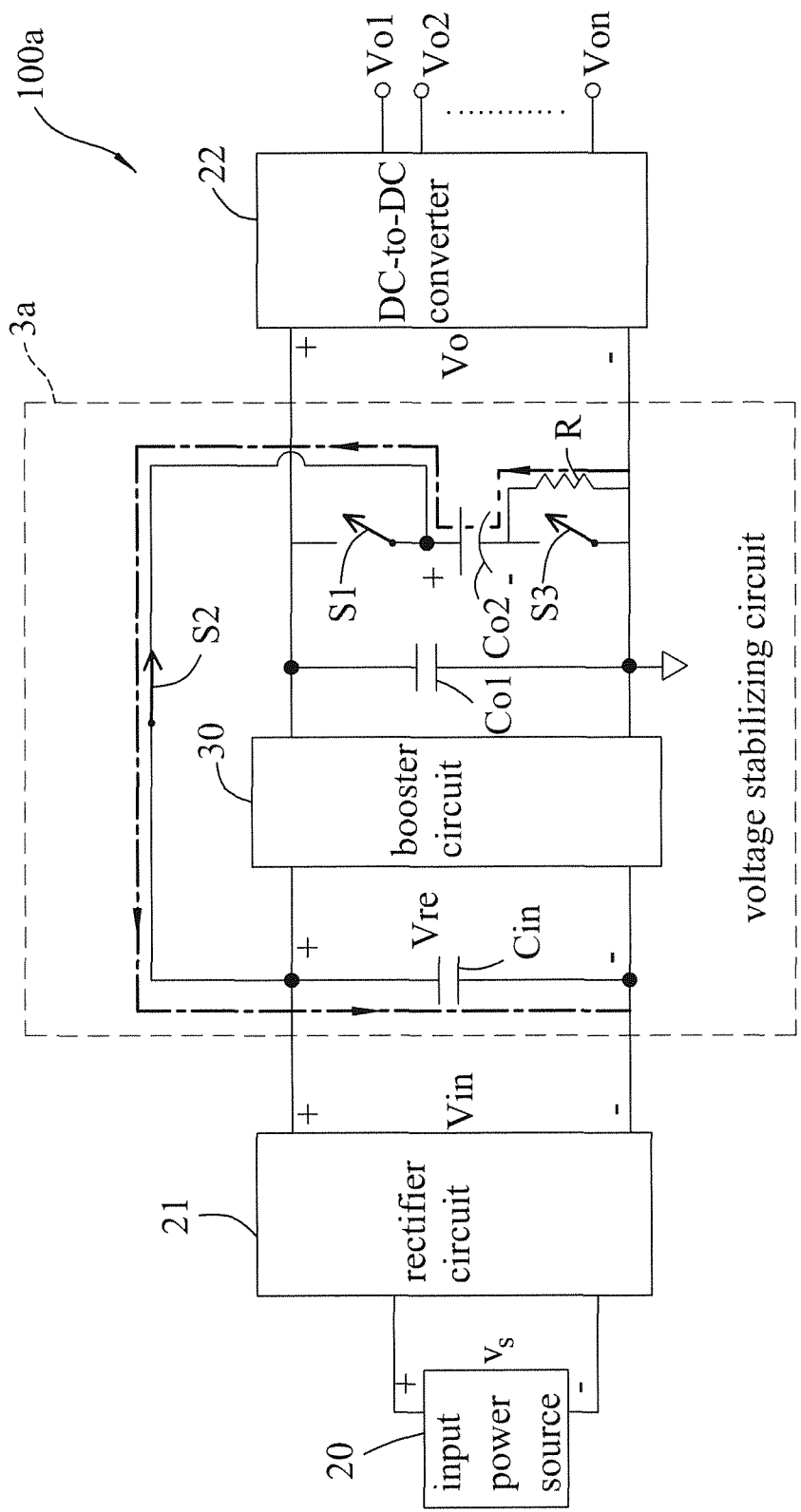
FIG. 9 is a schematic electrical circuit block diagram illustrating the second embodiment when the voltage stabilizing circuit is operated in a power-down state.
Figure 10:
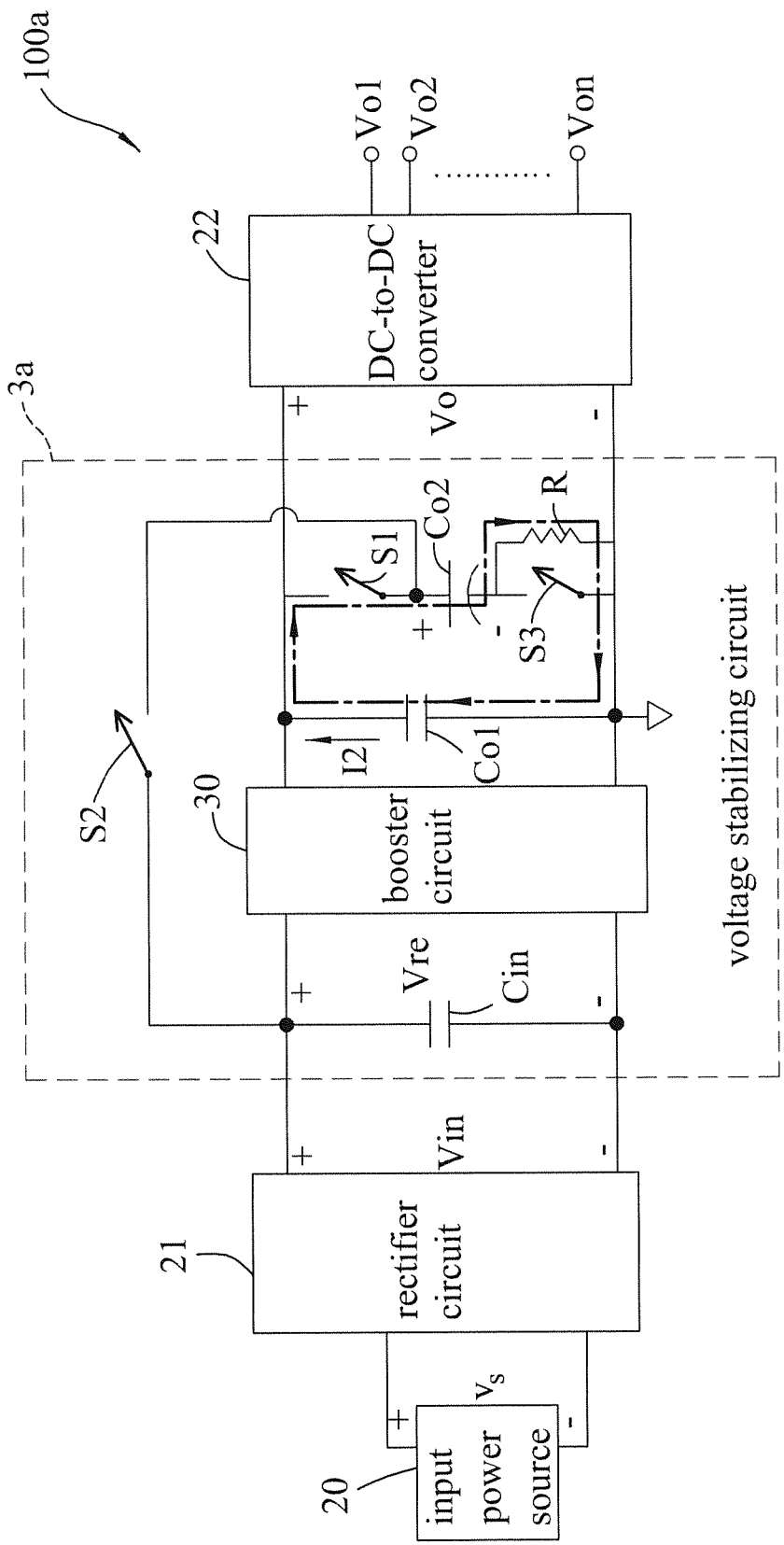
FIG. 10 is a schematic electrical circuit block diagram illustrating the second embodiment when the voltage stabilizing circuit returns from the power-down state to the normal state.

Referring to FIG. 9, when a brownout condition suddenly or temporarily occurs in the AC input voltage ($v_s$), for example, the input power source 20 suddenly terminates supply of the AC input voltage ($v_s$), the regulated voltage (Vre) begins to decrease. When it is determined by the controller 50 that the regulated voltage (Vre) is less than the predetermined reference voltage, the voltage stabilizing circuit (3a) is configured to operate in a power-down state. In the power-down state, the first and second power switches (S1, S3) are controlled by the controller 50 to be non-conducting while the second power switch (S2) is controlled by the controller 50 to be conducting. Thus, the input capacitor (Cin) is charged with electric energy previously accumulated on the second output capacitor (Co2) in the normal state through the second power switch (S2), such that the regulated voltage (Vre) is raised up to be not less than the predetermined reference voltage. Therefore, the booster circuit 30 may stably output the predetermined voltage, which is regarded as the output voltage (Vo), within a regulation period after the occurrence of the brownout condition. As a result, the DC voltage(s) (Vo1-Von) may still be normally supplied by the DC-to-DC converter 22 during the regulation period, thereby enabling normal operation(s) of the backend load(s), for example, storing information.

When the brownout condition disappears, i.e., the input power source 20 normally supplies the AC input voltage ($v_s$) again, the voltage stabilizing circuit (3a) returns from the power-down state to the normal state. In this case, since the capacitance of the first output capacitor (Co1) is small than that of the second output capacitor (Co2), the first output capacitors (Co1) may be charged to reach the output voltage (Vo) fast. In addition, during a transition period from the power-down state to the normal state (see FIG. 10), the second and third power switches (S2, S3) are controlled by the controller 50 to be non-conducting while the first power switch (S1) is controlled by the controller 50 to operate in a pulse width modulation (PWM) manner Thus, using a soft-start manner, a current (I2) flowing out of the first output capacitor (Co1) may flow through the first power switch (S1), the second output capacitor (Co2) and the current limiting resistor (R), thereby charging the second output capacitor (Co2) with the current (I2). It is noted that, due to the current limiting resistor (R), the second output capacitor (Co2) may not be subjected to excessive current impact. When it is determined by the controller 50 that the voltage across the second output capacitor (Co2) has reached the same level as that of the voltage across the first output capacitor (Co1), the first and third power switches (S1, S3) are controlled by the controller 50 to be conducting while the second power switch (S2) is controlled by the controller 50 to be non-conducting, and that is to say, the voltage stabilizing circuit (3a) is configured to operate in the normal state. As a result, the booster circuit 30 may stably output the predetermined voltage that is applied to the first output capacitor (Co1) to serve as the output voltage (Vo). Therefore, the DC-to-DC converter 22 may still normally output the DC voltage(s) (Vo1-Von) in response to the stable output voltage (Vo) from the voltage stabilizing circuit (3a).

To sum up, the first, second and third power switches (S1, S2, S3) of the voltage stabilizing circuit (3, 3a) are appropriately controlled based on the regulated voltage (Vre) across the input capacitor (Co1). Therefore, when the voltage stabilizing circuit (3, 3a) operates in the normal state in response to normal supply of the AC input voltage ($v_s$), the output voltage (Vo) is normally outputted to the DC-to-DC converter 22, and the second output capacitor (Co2) can be charged with the output voltage (Vo). When the voltage stabilizing circuit (3, 3a) operates in the power-down state in response to a brownout condition of the AC input voltage ($v_s$), the voltage stabilizing circuit (3, 3a) can still normally output the output voltage (Vo) to the DC-to-DC converter 22 within the regulation period after the brownout condition by charging the input capacitor (Cin) with the electric energy accumulated on the second output capacitor (Co2), such that the DC voltage(s) (Vo1-Von) can still be normally supplied by the DC-to-DC converter 22 during the regulation period. Furthermore, due to appropriate control of the first, second and third power switches (S1, S2, S3) of the voltage stabilizing circuit (3a), and the presence of the current limiting resistor (R) of the voltage stabilizing circuit (3a), the first and second output capacitors (Co1, Co2) can avoid excessive current impact upon start of the power supplying device (100a) and during the transition period of the voltage stabilizing circuit (3a) from the power-down state to the normal state.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A voltage stabilizing circuit comprising:
   an input capacitor having a first terminal and a second terminal;
   a booster circuit having an input side coupled across said input capacitor, and an output side;
   a first output capacitor having a first terminal and a grounded second terminal that are coupled to said output side of said booster circuit;
   a series connection of a first power switch and a second output capacitor coupled between said first and second terminals of said first output capacitor, said first power switch having a first terminal coupled to said first terminal of said first output capacitor and a second terminal, said second output capacitor having a first terminal coupled to said second terminal of said first power switch at a common node and a second terminal coupled to said second terminal of said first output capacitor;
   a second power switch coupled between said first terminal of said input capacitor and said common node; and
   a parallel connection of a third power switch and a current limiting resistor coupled between said second terminal of said second output capacitor and said second terminal of said first output capacitor;
   wherein said input capacitor is configured to filter and regulate a DC input voltage so as to generate a regulated voltage thereacross;
   wherein said booster circuit is configured to receive the regulated voltage at said input side, to boost the regulated voltage to a predetermined voltage, and to output the predetermined voltage at said output side;
   wherein said first and second power switches are controlled based at least on the regulated voltage and a predetermined reference voltage; and
   wherein each of said first, second and third power switches includes one of a metal-oxide-semiconductor field effect transistor, an insulated gate bipolar transistor and a bipolar junction transistor.

2. The voltage stabilizing circuit of claim 1, wherein:
   when the regulated voltage is not less than the predetermined reference voltage, said first power switch is controlled to be conducting while said second power switch is controlled to be non-conducting; and
   when the regulated voltage is less than the predetermined reference voltage, said first power switch is controlled to be non-conducting while said second power switch is controlled to be conducting.

3. The voltage stabilizing circuit of claim 1, wherein:
   said third power switch is actuated by a controller based at least on the regulated voltage and the predetermined reference voltage;
   when the regulated voltage is not less than the predetermined reference voltage, said third power switch is controlled to be conducting; and
   when the regulated voltage is less than the predetermined reference voltage, said third power switch is controlled to be non-conducting.

4. The voltage stabilizing circuit of claim 3, wherein, when the regulated voltage less than the predetermined reference voltage becomes not less than the predetermined reference voltage, said second and third power switches are controlled to be non-conducting while said first power switch is controlled to operate in a pulse width modulation manner, such that said second output capacitor is charged with a current flowing through said first output capacitor, said first power switch, said second output capacitor and said current limiting resistor and such that said first and third power switches are controlled to be conducting when two voltages respectively across said first and second output capacitors are the same.

5. The voltage stabilizing circuit of claim 4, wherein said first, second and third power switches are controlled based further on the voltage across said second output capacitor.

6. The voltage stabilizing circuit of claim 1, wherein said booster circuit is one of a boost converter, a buck-boost converter and a single-ended primary inductance converter.

7. A voltage stabilizing circuit comprising:
   an input capacitor having a first terminal and a second terminal;
   a booster circuit having an input side coupled across said input capacitor, and an output side;

a first output capacitor having a first terminal and a grounded second terminal that are coupled to said output side of said booster circuit;
a series connection of a first power switch and a second output capacitor coupled between said first and second terminals of said first output capacitor, said first power switch having a first terminal coupled to said first terminal of said first output capacitor and a second terminal, said second output capacitor having a first terminal coupled to said second terminal of said first power switch at a common node and a second terminal coupled to said second terminal of said first output capacitor;
a second power switch coupled between said first terminal of said input capacitor and said common node; and
a parallel connection of a third power switch and a current limiting resistor coupled between said second terminal of said second output capacitor and said second terminal of said first output capacitor;
wherein said input capacitor is configured to filter and regulate a DC input voltage so as to generate a regulated voltage thereacross; said booster circuit is configured to receive the regulated voltage at said input side, to boost the regulated voltage to a predetermined voltage, and to output the predetermined voltage at said output side; and said first and second power switches are controlled based at least on the regulated voltage and a predetermined reference voltage.

8. The voltage stabilizing circuit of claim 7, wherein:
said third power switch is actuated by a controller based at least on the regulated voltage and the predetermined reference voltage;
when the regulated voltage is not less than the predetermined reference voltage, said third power switch is controlled to be conducting; and
when the regulated voltage is less than the predetermined reference voltage, said third power switch is controlled to be non-conducting.

9. The voltage stabilizing circuit of claim 8, wherein, when the regulated voltage less than the predetermined reference voltage becomes not less than the predetermined reference voltage, said second and third power switches are controlled to be non-conducting while said first power switch is controlled to operate in a pulse width modulation manner, such that said second output capacitor is charged with a current flowing through said first output capacitor, said first power switch, said second output capacitor and said current limiting resistor and such that said first and third power switches are controlled to be conducting when two voltages respectively across said first and second output capacitors are the same.

10. The voltage stabilizing circuit of claim 9, wherein said first, second and third power switches are controlled based further on the voltage across said second output capacitor.

11. The voltage stabilizing circuit of claim 7, wherein each of said first, second and third power switches includes one of a metal-oxide-semiconductor field effect transistor, an insulated gate bipolar transistor and a bipolar junction transistor.

12. A voltage stabilizing circuit comprising:
an input capacitor having a first terminal and a second terminal;
a booster circuit having an input side coupled across said input capacitor, and an output side;
a first output capacitor having a first terminal and a grounded second terminal that are coupled to said output side of said booster circuit;
a series connection of a first power switch and a second output capacitor coupled between said first and second terminals of said first output capacitor, said first power switch having a first terminal coupled to said first terminal of said first output capacitor and a second terminal, said second output capacitor having a first terminal coupled to said second terminal of said first power switch at a common node and a second terminal coupled to said second terminal of said first output capacitor;
a second power switch coupled between said first terminal of said input capacitor and said common node; and
a parallel connection of a third power switch and a current limiting resistor coupled between said second terminal of said second output capacitor and said second terminal of said first output capacitor;
wherein said first power switch when non-conducting electrically isolates said first terminal of said second output capacitor from said first terminal of said first output capacitor;
wherein said input capacitor is configured to filter and regulate a DC input voltage so as to generate a regulated voltage thereacross;
wherein said booster circuit is configured to receive the regulated voltage at said input side, to boost the regulated voltage to a predetermined voltage, and to output the predetermined voltage at said output side; and
wherein said first and second power switches are controlled based at least on the regulated voltage and a predetermined reference voltage.

13. The voltage stabilizing circuit of claim 12, wherein:
when the regulated voltage is not less than the predetermined reference voltage, said first power switch is controlled to be conducting while said second power switch is controlled to be non-conducting; and
when the regulated voltage is less than the predetermined reference voltage, said first power switch is controlled to be non-conducting while said second power switch is controlled to be conducting.

14. The voltage stabilizing circuit of claim 12, wherein:
said third power switch is actuated by a controller based at least on the regulated voltage and the predetermined reference voltage;
when the regulated voltage is not less than the predetermined reference voltage, said third power switch is controlled to be conducting; and
when the regulated voltage is less than the predetermined reference voltage, said third power switch is controlled to be non-conducting.

15. The voltage stabilizing circuit of claim 14, wherein, when the regulated voltage less than the predetermined reference voltage becomes not less than the predetermined reference voltage, said second and third power switches are controlled to be non-conducting while said first power switch is controlled to operate in a pulse width modulation manner, such that said second output capacitor is charged with a current flowing through said first output capacitor, said first power switch, said second output capacitor and said current limiting resistor and such that said first and third power switches are controlled to be conducting when two voltages respectively across said first and second output capacitors are the same.

* * * * *